US006349782B1

(12) United States Patent
Sekiya et al.

(10) Patent No.: US 6,349,782 B1
(45) Date of Patent: Feb. 26, 2002

(54) FRONT-AND-REAR WHEEL DRIVE VEHICLE

(75) Inventors: Shigenobu Sekiya; Takashi Kuribayashi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,499

(22) Filed: May 11, 2000

(30) Foreign Application Priority Data

May 12, 1999 (JP) .......................................... 11-131887

(51) Int. Cl.[7] .................................................. B60K 1/00

(52) U.S. Cl. ...................................... 180/65.2; 180/197

(58) Field of Search ................................ 180/233, 247, 180/197, 65.1, 65.2, 65.4, 65.6, 65.7, 65.8; 290/9, 45; 318/139, 430, 432, 136, 137, 144, 433, 434, 493

(56) References Cited

U.S. PATENT DOCUMENTS 3,630,304 A * 12/1971 Sahinkaya .................. 180/105
4,180,138 A * 12/1979 Shea ........................... 180/65
4,335,429 A * 6/1982 Kawakatsu ................. 364/424
4,351,405 A * 9/1982 Fields et al. .................. 180/65
4,549,121 A * 10/1985 Gale .......................... 318/301
4,923,025 A * 5/1990 Ellers ........................ 180/65.2
5,176,213 A * 1/1993 Kawai et al. ............... 180/243
5,289,890 A * 3/1994 Toyoda et al. ............. 180/65.8
5,368,120 A * 11/1994 Sakai et al. ................. 180/197
5,495,906 A * 3/1996 Furutani .................... 180/65.2
5,788,005 A * 8/1998 Arai .......................... 180/65.2
5,793,175 A * 8/1998 Journey ...................... 318/493
5,947,855 A * 9/1999 Weiss ............................ 475/5
5,984,034 A * 11/1999 Morisawa et al. ......... 180/65.2
6,008,606 A * 12/1999 Arai et al. .................. 318/431
6,205,379 B1 * 3/2001 Morisawa et al. ............ 701/22

FOREIGN PATENT DOCUMENTS

JP 8-175209 7/1996 ......... B60K/17/356
JP 9-79348 3/1997 ........... F16H/48/20
JP 10073033 * 3/1998

* cited by examiner

*Primary Examiner*—Brian L. Johnson
*Assistant Examiner*—Daniel Yeagley
(74) *Attorney, Agent, or Firm*—Sughrue Mion, PLLC

(57) ABSTRACT

A front-and-rear wheel drive vehicle includes an engine driving a pair of front wheels and rear wheels, and a field-control motor driving the other pair of front wheels and rear wheels. Also included is a speed sensor detecting the rotating speed of the other pair of wheels, and a control unit controlling field current of the motor based on the detected rotating speed. The motor drives the other pair of wheels such as to render assistance in starting the vehicle, and the assistance terminates when the vehicle speed reaches a predetermined value.

13 Claims, 10 Drawing Sheets

V
W_RR
W_RL
W_FR
W_FL
4R
4L
3R
3L
MR
ML
D
S6
S6
S2
S2
S1
S1
S3
S4
S5
U
7
8
6
2
C
B2
B2
G
B1
1
E

W_RR
W_RL
M_R
M_L
52
D
P
4R
4L
40R
40L
41R
41L
30
31
32
33
34
35
36
37
38
39
42
43
44
45
46
47
48
21

P
P
42
42
43
43
44₁
44
48
48₁
48₂
48₃
47
47₁
49
49₁
49₂
49₃
50
51
52
53
54
55
46
21
22L
22R
23L
23R

P
42
43
44₁
P
43
42
48₂
48₃
49₂
55
49
49₃
54
49₁
48
44
50
47₁,48₁
47
51
23R
22R
46
21
22L
53
23L
52

ML
(MR)
im
B2
U
C
G
ACG
B1

FRONT-AND-REAR WHEEL DRIVE VEHICLE

BACKGROUND OF THE INVENTION

1. Field of the Invention

The present invention relates to a front-and-rear wheel drive vehicle in which one of pairs of front and rear wheels is driven by an engine, while the other pair is driven by start assisting motors.

2. Description of the Related Art

A front-and-rear wheel drive vehicle as described above is known in, for example, Japanese Patent Unexamined Publication No. Hei. 8-175209. In addition, a technology is also known in which a low speed-high torque characteristic and a high speed low-torque characteristic are allowed to coexist with each other by a single field-control motor, which can change the field current thereof without provision of a transmission by making the field current of the motor strong when the motor rotation number is slow and the field current weak when the motor rotation number is fast.

When the field-control motor is used as a start assisting motor for a front-and-rear wheel drive vehicle, the start assisting performance can be improved by switching the low speed-high torque characteristic to the high speed-low torque characteristic or vice versa in response to a change in motor rotation number. This, however, requires a motor rotation number sensor for detecting the rotation number of the field-control motor and results in a increase of cost.

SUMMARY OF THE INVENTION

The present invention was made in view of the aforesaid problem, and an object thereof is to enable the utilization of the field-control motor described above as a start assisting motor for a front-and-rear wheel drive vehicle without the necessity of a special motor rotation number sensor.

With a view to attaining the aforesaid object, according to a first feature of the invention, there is provided a front-and-rear wheel drive vehicle comprising an engine for driving a pair of front wheels and rear wheels. Also included are motors for driving the other pair of front wheels and rear wheels, wherein the motors drive the other pair of wheels when a vehicle starts to render assistance in starting, and wherein the assistance in starting is stopped when the vehicle speed reaches a predetermined value. The motors comprise field-control motors, and the control means is provided for controlling field current of the motors based on outputs from the speed sensors for detecting the rotating speeds of the other pair of wheels.

According to the above construction, since the speed of the motor and the speed of the wheels rotated by the motor has a certain relationship, there is no need to provide a speed sensor for detecting the rotating speed of the wheels rotated by the motor, and the vehicle's start assisting performance can be improved by controlling the field current of the motor based on outputs from the speed sensor for detecting the rotating speed of the wheels to switch the low speed-high torque and high speed-low torque characteristics of the motor at will. In particular, utilization of the speed sensor for this purpose, which is initially provided on the vehicle for the anti-lock brake and traction control systems, can contribute to reduction in the number of components involved and production cost.

DETAILED DESCRIPTION OF THE PREFERRED EMBODIMENTS

Figure 1:
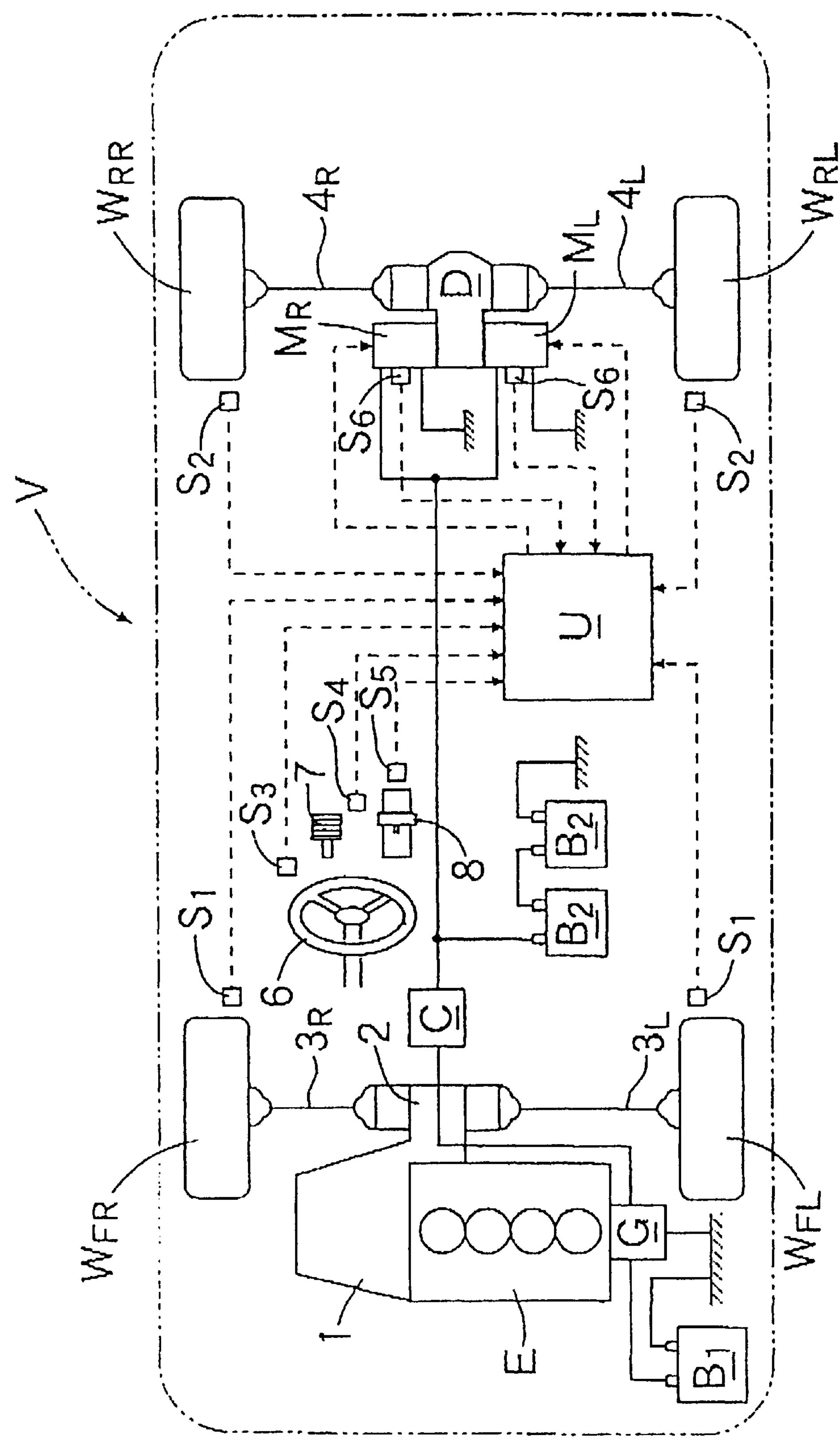
FIG. 1 is a diagram showing the overall construction of a front-and-rear wheel drive vehicle.

A mode for carrying out the invention will be described below based on an embodiment of the present invention shown in the accompanying drawings.

FIGS. 1 to 10 show a first embodiment of the present invention. First, referring to FIG. 1, the overall construction of a front-and-rear wheel drive vehicle according to the embodiment of the invention will be described.

A vehicle V is provided with an engine E which is transversely disposed in a front part of a vehicle body thereof. The driving force of this engine is transferred to left and right front wheels $W_{FL}$, $W_{FR}$ via a transmission 1, a differential 2 and left and right drive shafts $\mathbf{3}_L$, $\mathbf{3}_R$. A generator G adapted to be driven by the engine E is connected to a first battery $B_1$ of 12 volts for feeding electricity to vehicle's headlamps, brake lamps, starter motor, air conditioner and various types of electrical equipment such as audio equipment.

A rear wheel driving device D adapted to be powered by a pair of direct current motors $M_L$, $M_R$ is provided in a rear part of the vehicle body. The driving forces of these motors $M_L$, $M_R$ are transferred, respectively, to left and right rear wheels $W_{RL}$, $W_{RR}$ via the rear wheel driving device D and left and right drive shafts $\mathbf{4}_L$, $\mathbf{4}_R$ Two second batteries $B_2$, $B_2$ of 12 volts each are connected to each other in series, and the generator G is connected to these second batteries $B_2$, $B_2$ via a DC-DC converter. The operation of the motors $M_L$, $M_R$ is controlled by an electronic control unit U comprising a microcomputer.

Inputted into the electronic control unit U to control the driving of the motors $M_L$, $M_R$ are signals from front wheel speed sensors $S_1$, $S_1$ for detecting the rotating speeds of the left and right front wheels $W_{FL}$, $W_{FR}$, rear wheel rotation number sensors $S_2$, $S_2$ for detecting the rotating speeds of the left and right rear wheels $W_{RL}$, $W_{RR}$, a steering angle sensor $S_3$ for detecting the steering angle of a steering wheel 6, a brake operation sensor $S_4$ for detecting the operation of a brake pedal 7,a shift position sensor 55 for detecting whether a selector lever 8 is in a forward position or in a reverse position, and current sensors $S_6$, $S_6$ for detecting armature current of the motors $M_L$, $M_R$.

Figure 2:
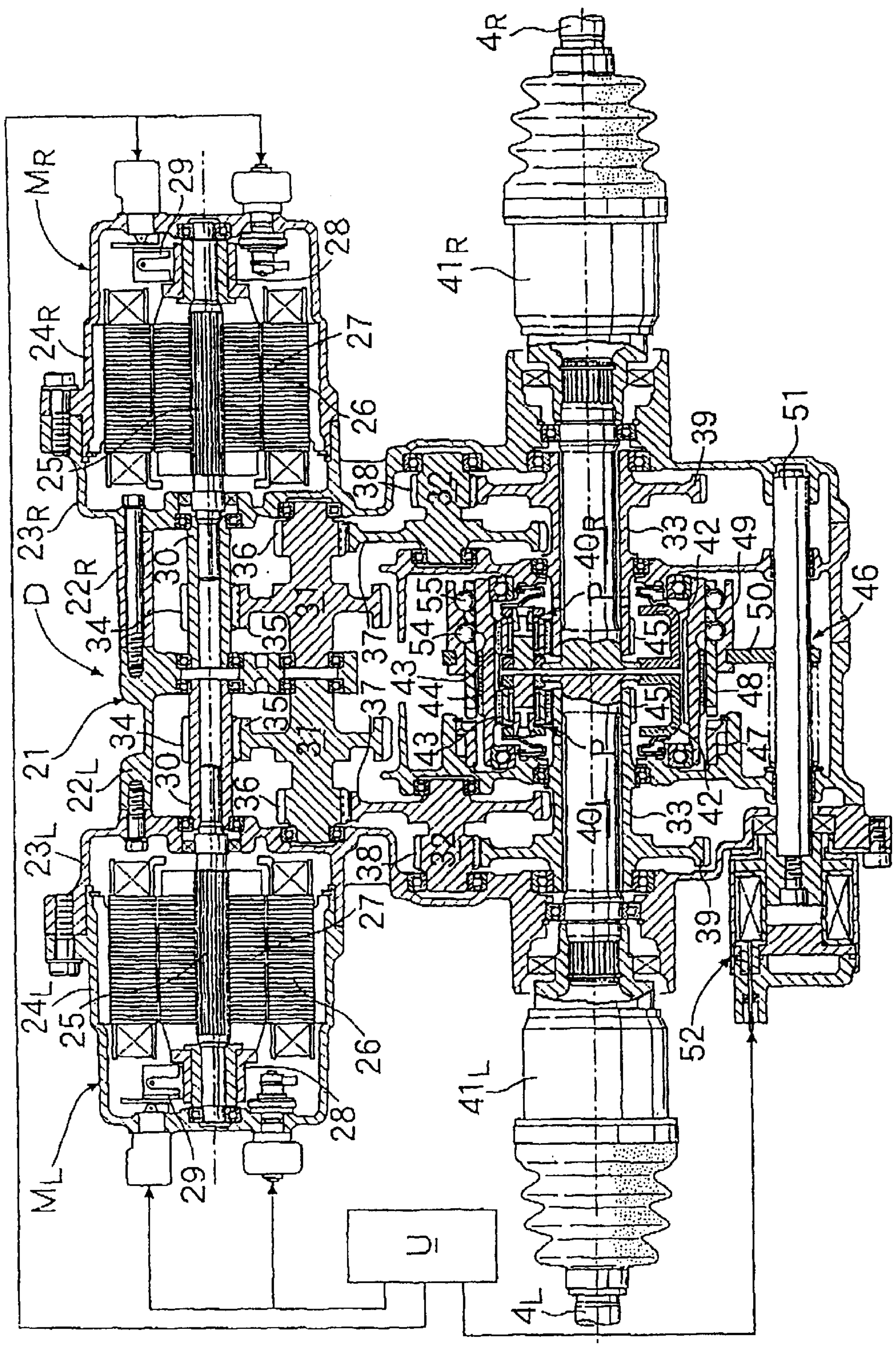
FIG. 2 is an enlarged sectional view of a rear wheel driving device.
Figure 3:
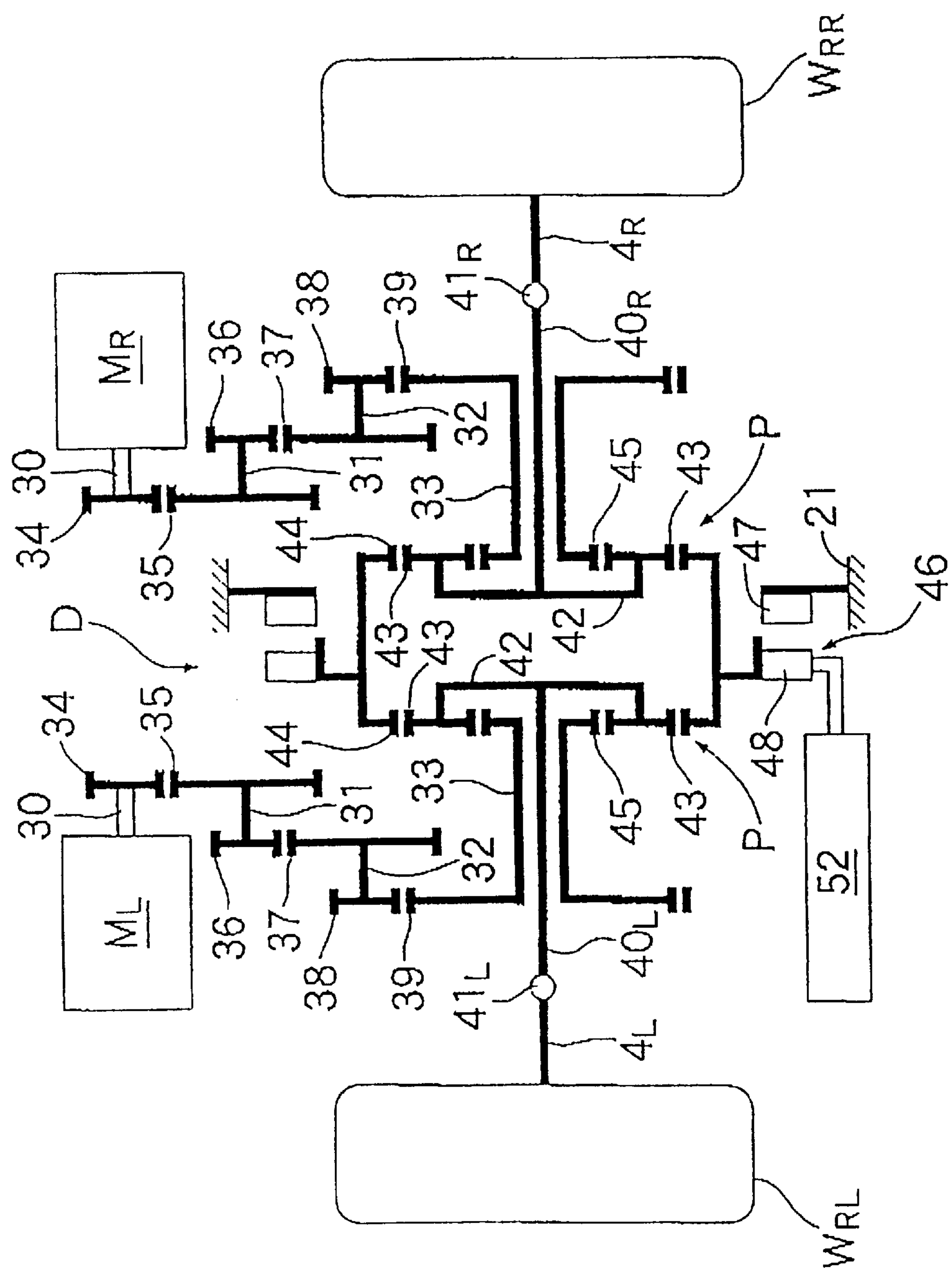
FIG. 3 is a skeleton diagram of the rear wheel driving device.

Next, referring to FIGS. 2 and 3, the constructions of the rear wheel driving device D and the motors $M_L$, $M_R$ will be described.

A casing 21 for the rear wheel driving device D comprises an left casing main body $22_L$ and a right casing main body $22_R$ which are coupled to each other, an left casing cover $23_L$ coupled to an left side of the left casing main body $22_L$ and a right casing cover $23_R$ coupled to a right side of the right casing main body $22_R$. A motor housing $24_L$ of the left-hand side motor $M_L$ is secured to an left side of the left casing cover $23_L$, and a motor housing $24_R$ of the right-hand side motor $M_R$ is secured to a right side of the right casing cover $23_R$. The respective motors $M_L$, $M_R$ comprise motor shafts 25, 25 rotatably supported on the left and right casing covers $23_L$, $23_R$ and the motor housings $24_L$, $24_R$, stators 26, 26 secured to inner circumferential surfaces of the motor housings $24_L$, $24_R$, rotors 27, 27 secured to the motor shafts 25, 25, commutators 28, 28 secured to the motor shafts 25, 25 and brushes 29, 29 brought into contact with the commutators 28, 28.

Input shafts 30, 30, first speed reducing shafts 31, 31, second speed reducing shafts 32, 32 and third speed reducing shafts 33, 33 are supported in parallel, respectively, between the left casing main body $22_L$ and the left casing cover $23_L$, and between the right casing main body $22_R$ and the right casing cover $23_R$. The motor shafts 25, 25 are splined, respectively, to inner circumferential surfaces of the tubularly formed-input shafts 30, 30. First reduction gears 34, 34 provided respectively on the input shafts 30, 30 engage with second reduction gears 35, 35 provided respectively on the first speed reducing shafts 31, 31, third reduction gears 36, 36 provided respectively on the first speed reducing shafts 31, 31 engage with fourth reduction gears 37, 37 provided respectively on the second speed reducing shafts 32, 32, and fifth reduction gears 38, 38 provided respectively on the second speed reducing shafts 32, 32 engage with sixth reduction gears 39, 39 provided respectively on the third speed reducing shafts 33, 33. Therefore, the rotations of the motor shafts 25, 25 are transferred to the third speed reducing shafts 33, 33 via the first to sixth reduction gears 34 to 39, 34 to 39.

Left and right output shafts $40_L$, $40_R$ fit in the interiors of the left and right tubularly formed third speed reducing shafts 33, 33 so as to rotate relative to each other, and the output shafts $40_L$, $40_R$ protrude outwardly of the third speed reducing shafts 33, 33 to thereby be supported on the left and right casing covers $23_L$, $23_R$, respectively. Then, outer ends of the left and right output shafts $40_L$, $40_R$ are connected to the left and right rear wheels $W_{RL}$, $W_{RR}$, respectively, via constant velocity joints $41_L$, $41_R$ and the drive shafts $4_L$, $4_R$.

The left and right third speed reducing shafts 33, 33 and the left and right output shafts $40_L$, $40_R$ are connected, respectively, to planetary gear mechanisms P, P. The left and right planetary gear mechanisms P, P are substantially identical to each other in construction.

The planetary gear mechanisms P, P comprise planetary carriers 42, 42 integrally provided on inner ends of the output shafts $40_L$, $40_R$, a plurality of planetary gears 43, . . . rotatably supported on the planetary carries 42, 42, a ring gear 44 rotatably supported on the left and right casing main body $22_L$, $22_R$ so as to be in mesh engagement with the planetary gears 43, . . . and sun gears 45, 45 provided respectively on the third speed reducing shafts 33, 33 for mesh engagement with the planetary gears 43, . . . The ring gear 44 is integrally formed so as to be shared between the left and right planetary gear mechanisms P, P.

Figure 4:
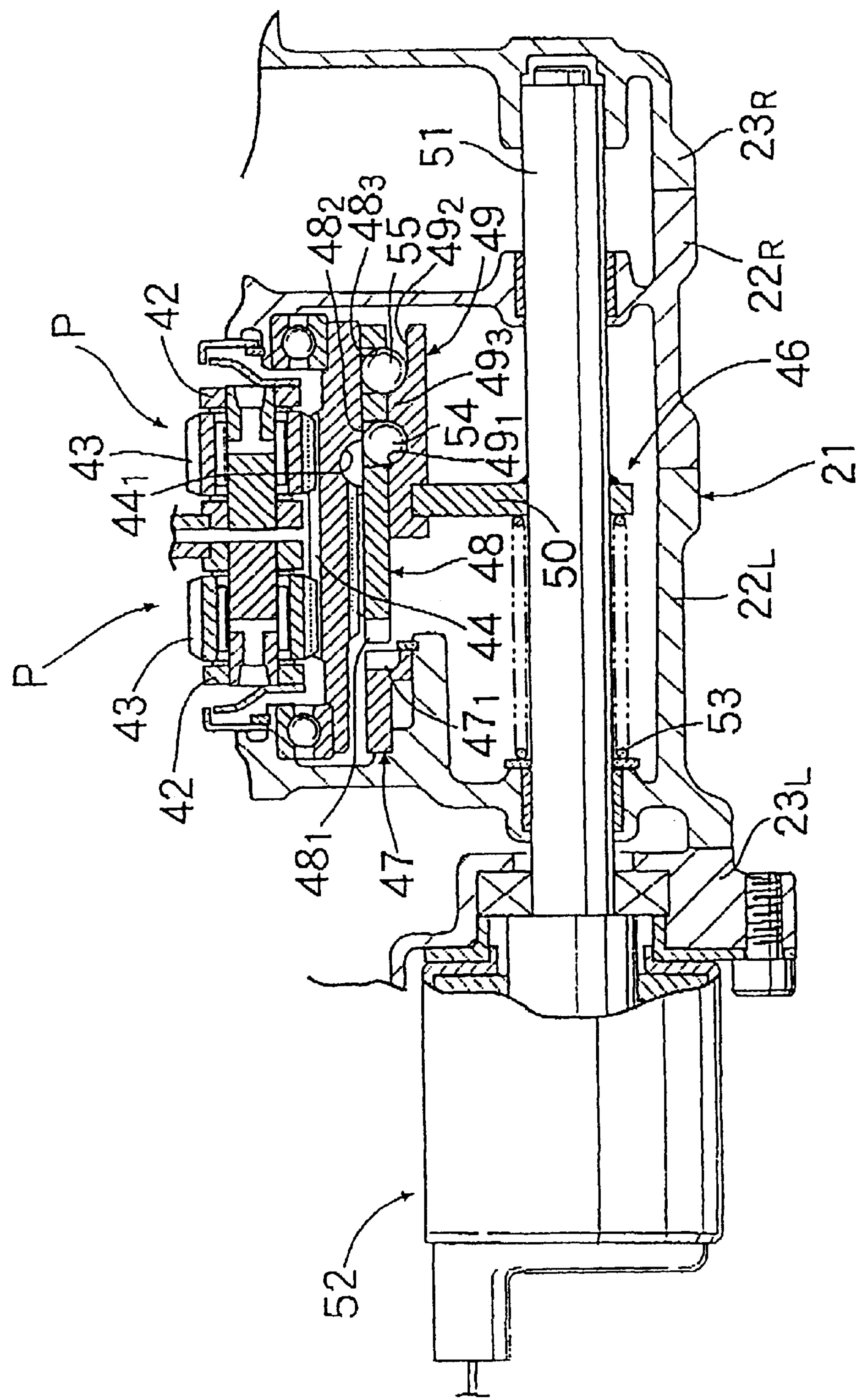
FIG. 4 is an enlarged view of a main part of the rear wheel driving device shown in FIG. 2 showing the construction of a dog clutch.

As shown in FIG. 4, the ring gear 44 adapted to be shared by the left and right planetary gear mechanisms P, P can be coupled to the casing 21 by means of a dog clutch 46. The dog clutch 46 comprises a stationary dog 47 secured to the left casing main body $22_L$, a movable dog 48 splined to the outer circumference of the ring gear 44 in such a manner as to slide in axial directions and provided with dog teeth 48, adapted to engage with dog teeth 47 of the stationary dog 47, a shift sleeve 49 adapted to fit on the outer circumference of the movable dog 48 in such a manner as to slide in the axial directions, a shift fork 50 adapted to engage with the shift sleeve 49, a shift rod 51 supported slidably on the casing 21 so as to support the shift fork 50 thereon, a shift solenoid 52 for driving the shift rod 51 in an leftward direction as viewed in the figure when excited and a return spring 53 for driving back the shift rod.51 in a rightward direction as viewed in the figure when the shift solenoid 52 is not excited.

Two through holes $48_2$, $48_3$ are formed in the movable dog 48 for accommodating two lock balls 54, 55, a depressed portion $44_1$ is formed in the outer circumferential surface of the ring gear 44 confronting the movable dog 48, and two depressed portions. $49_1$, $49_2$ are formed in an inner circumferential surface of the shift sleeve 49 confronting the movable dog 48.

Thus, as shown in FIG. 4, when the shift solenoid 52 is in the non-excitation state and the shift rod 51 is moved in the rightward direction as viewed in the figure, the two through holes $48_2$, $48_3$ of the movable dog 48 and the two depressed portions $49_1$, $49_2$ of the shift sleeve 49 align with each other, and the two lock balls 54, 55 fit in there which are biassed radially outwardly by virtue of the centrifugal force. In this state, there is no chance for the lock balls 54, 55 to be brought into engagement with the depressed portion 44, of the ring gear 44, and therefore the ring gear 44 can freely rotate.

Figure 5:
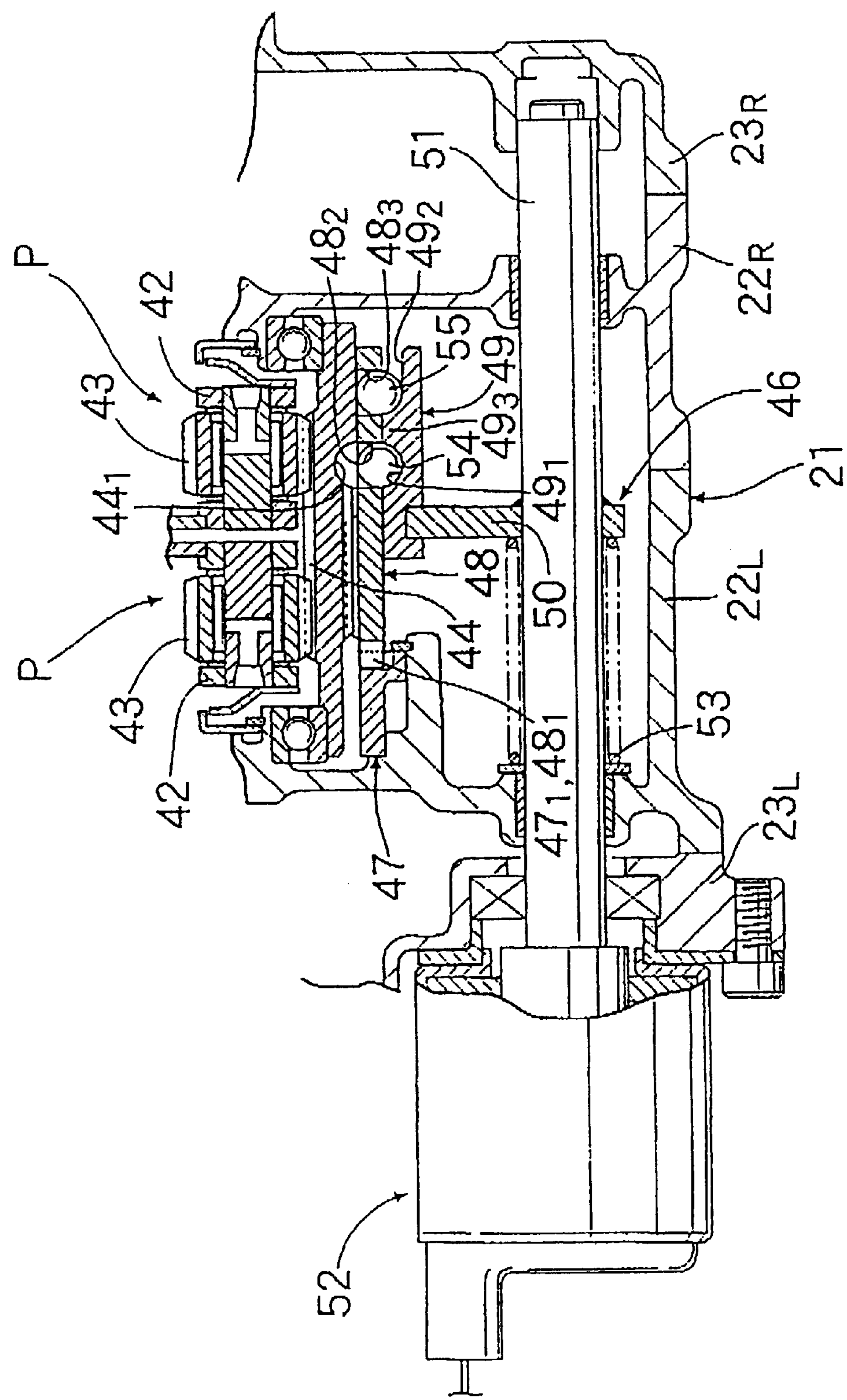
FIG. 5 is an operation explanatory diagram corresponding to FIG. 4.
Figure 6:
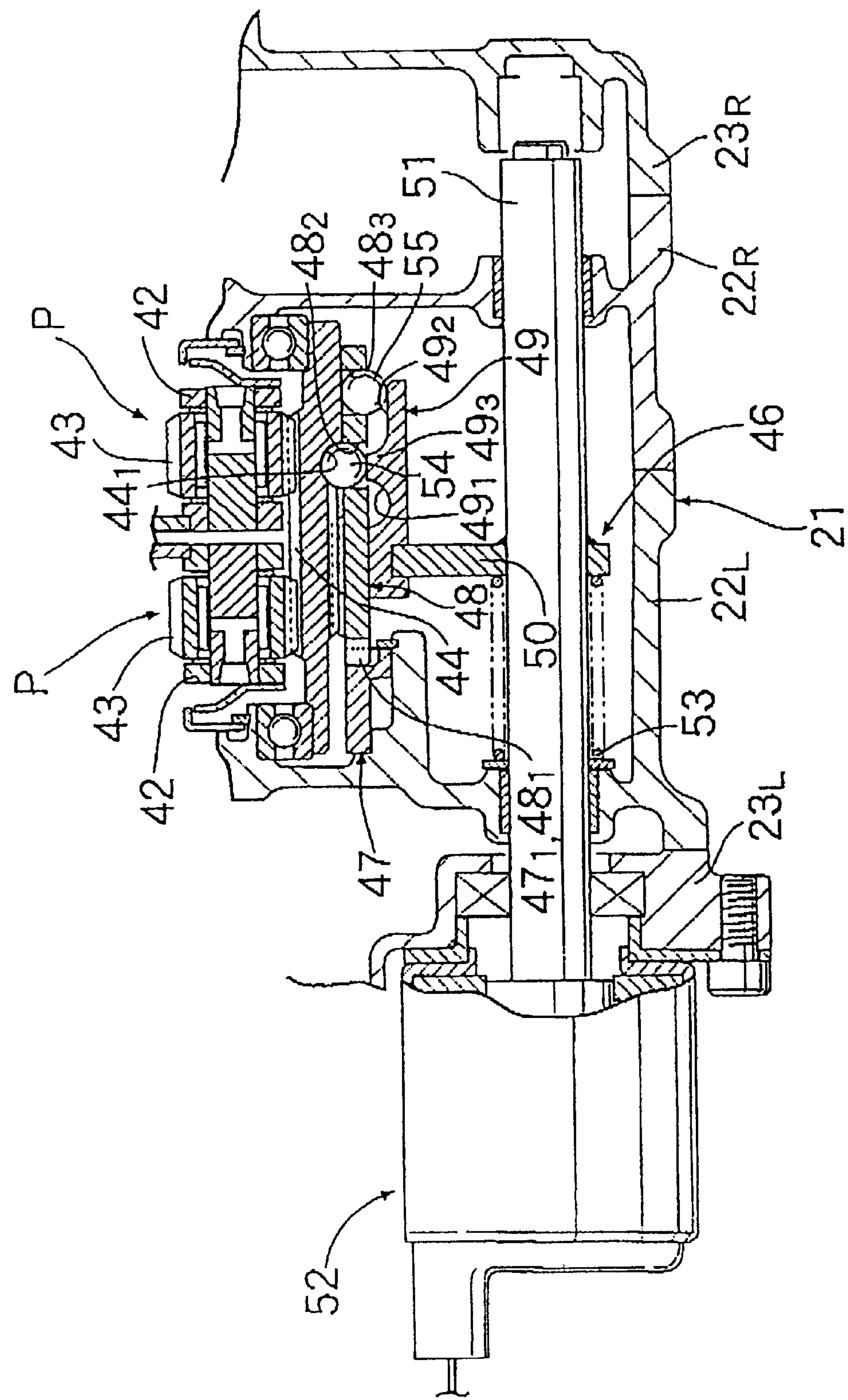
FIG. 6 is an operation explanatory diagram corresponding to FIG. 4.

As shown in FIG. 5, when the shift solenoid 52 is excited and the shift rod 51 is moved to the leftward direction as viewed in the figure, the shift rod 51 moves the movable dog 48 leftward via the shift fork 50, the shift sleeve 49 and the lock balls 54, 55, and the dog teeth 48, of the movable dog 48 engages with the dog teeth 47, of the stationary dog 47. As shown in FIG. 6, when the shift rod 51 is moved further leftward by the shift solenoid 52, the lock ball 54, which is one of the lock balls 54, 55, rides on a raised portion $49_3$ formed between the two depressed portions $49_1$, $49_2$ of the shift sleeve 49, and part of the lock ball 54 pushed out of the through hole $48_2$ of the movable dog 48 engages with the depressed portion $44_1$ of the ring gear 44. As a result of this, the ring gear 44 is coupled to the left casing main body $22_L$ via the lock ball. 54, the movable dog 48 and the stationary dog 47 in such a manner as to prohibit the rotation thereof.

When the vehicle V starts, the start assisting control is performed by the rear wheel driving device D constructed as described above, and after the vehicle has started, turn control and differential restriction control are performed.

(1) Start Assisting Control

When the vehicle V starts forward in a state in which the brake operation sensor $S_4$ detects that the brake pedal 7 is not operated, the shift position detected by the shift position sensor $S_5$ is at a forward running position, and the rear wheel speeds Vr (i.e., the vehicle speed) detected by the rear wheel rotation number sensors $S_2$, $S_2$ are less than 15 km/h, the front wheel speeds Vf detected by the front wheel speed sensors $S_1$, $S_1$ are compared with the rear wheel speeds Vr detected by the rear wheel rotation number sensors $S_2$, $S_2$. When a deviation $\Delta V$ ($=Vf-Vr$) becomes equal to or larger than a threshold value $\Delta V$, in other words, when the slip amount of the front wheels $W_{FL}$, $W_{FR}$ driven by the engine E becomes equal to or larger than a predetermined value, as shown in FIG. 6, the shift solenoid 52 is excited for engagement of the dog clutch, whereby the left and right motors $M_L$, $M_R$ are driven to rotate forward at the same speed in a state in which the ring gear 44 of the planetary gear mechanisms P, P is secured to the casing 21.

Then, the rotations of the left and right motors $M_L$, $M_R$ are transmitted to the sun gears 45, 45 of the planetary gear mechanisms P, P, but since the ring gear 44 is secured to the casing 21 by means of the dog clutch 46, the planetary gears 43, . . . which are in mesh with the sun gears 45, 45 and the ring gear 44 rotate around the sun gears 45, 45 while rotating on their own axes, and the planetary carriers 42, 42 supporting the planetary gears 43, . . . also rotate. As a result of this, the left and right rear wheels $W_{RL}$, $W_{RR}$ connected to the planetary carries 42, 42 via the output shafts $\mathbf{40}_L$, $\mathbf{40}_R$, the constant velocity joints $\mathbf{41}_L$, $\mathbf{41}_R$ and the drive shafts $\mathbf{4}_L$, $\mathbf{4}_R$ rotate forward at the same speed, whereby the forward start of the vehicle V is assisted.

When the shift position sensor $S_5$ detects that the shift position is at the reverse running position and the vehicle V starts in a reverse direction, with the dog clutch 46 left staying in the engaged state, if the left and right motors $M_L$, $M_R$ are driven to rotate in the reverse direction at the same speed, whereby the left and right rear wheels $W_{RL}$, $W_{RR}$ rotate in the reverse direction at the same speed, the reverse start of the vehicle V being thus assisted.

(2) Turn Control

When the vehicle V has started and the vehicle speed reaches 15 km/h, as shown in FIG. 4, the dog clutch 46 is held in the disengaged state, and the ring gear 44 of the planetary gear mechanisms P, P is allowed to freely rotate. In this state, for example, when the vehicle V turns rightward, the left-hand side motor $M_L$ is driven to rotate forward, while the right-hand side motor $M_R$ is driven to rotate in the reverse direction. Then, the left-hand side sun gear 45 rotates forward and the left-hand side planetary carrier 42 rotates forward relative to the ring gear. 44, and at the same time the right-hand side sun gear 45 is driven to rotate in the reverse direction and the right-hand side planetary carrier 42 rotates in the reverse direction relative to the ring gear 44. When this happens, since torques applied to the common ring gear 44 from the left and right planetary carriers 42, 42 are offset by each other, the speed of the left rear wheel $W_{RL}$ is increased, while that of the right rear wheel $W_{RR}$ is decreased. As a result of this, a driving force and a braking force are applied to the left rear wheel $W_{RL}$ and right rear wheel $W_{RR}$, respectively, and this generates a rightward yaw moment, the right turn of the vehicle being thereby assisted.

On the other hand, when the vehicle turns leftward, the driving force and the braking force are applied to the right rear wheel $W_{RR}$ and the left rear wheel $W_{RL}$, respectively, by rotating forward the right-hand side motor $M_R$ and rotating the left-hand side motor $M_L$ in the reverse direction, and an leftward yaw moment is generated, whereby the vehicle V is assisted in turning leftward. In addition, the driving amount of the left and right motors $M_L$, $M_R$ can be determined in response to a turning radius of the vehicle V estimated based on a steering angle detected by the steering angle sensor $S_3$ and a vehicle speed detected by the rear wheel rotation number sensors $S_2$, $S_2$.

(3) Differential Restriction Control

When running straight or tuning at high speed, a differential restriction function is provided in the rear wheel driving device D by producing a regenerative braking force by allowing the left and right motors $M_L$, $M_R$ to function as generators. In other words, the rotation of the left rear wheel $W_{RL}$ is braked through transmission thereof to the left-hand side motor $M_L$ via the planetary carrier 42, the planetary gears 43, . . . and the sun gear 45, and the rotation of the right rear wheel $W_{RR}$ is braked through transmission thereof to the right-hand side motor $M_R$ via the planetary carrier 42, the planetary gears 43, . . . and the sun gear 45. Then, since the left and right planetary gears 43, . . . are in mesh with the ring gear 44 disengaged from the casing 21, the difference rotation between the left and right rear wheels $W_{RL}$, $W_{RR}$ is restricted by the braking forces on the left and right motors $M_L$, $M_R$, whereby the differential restriction function is obtained. If a yaw moment is applied to the vehicle V due to disturbance, a yaw moment which opposes this yaw moment is generated, stability in straight running or high-speed turning being thereby improved.

Figure 7:
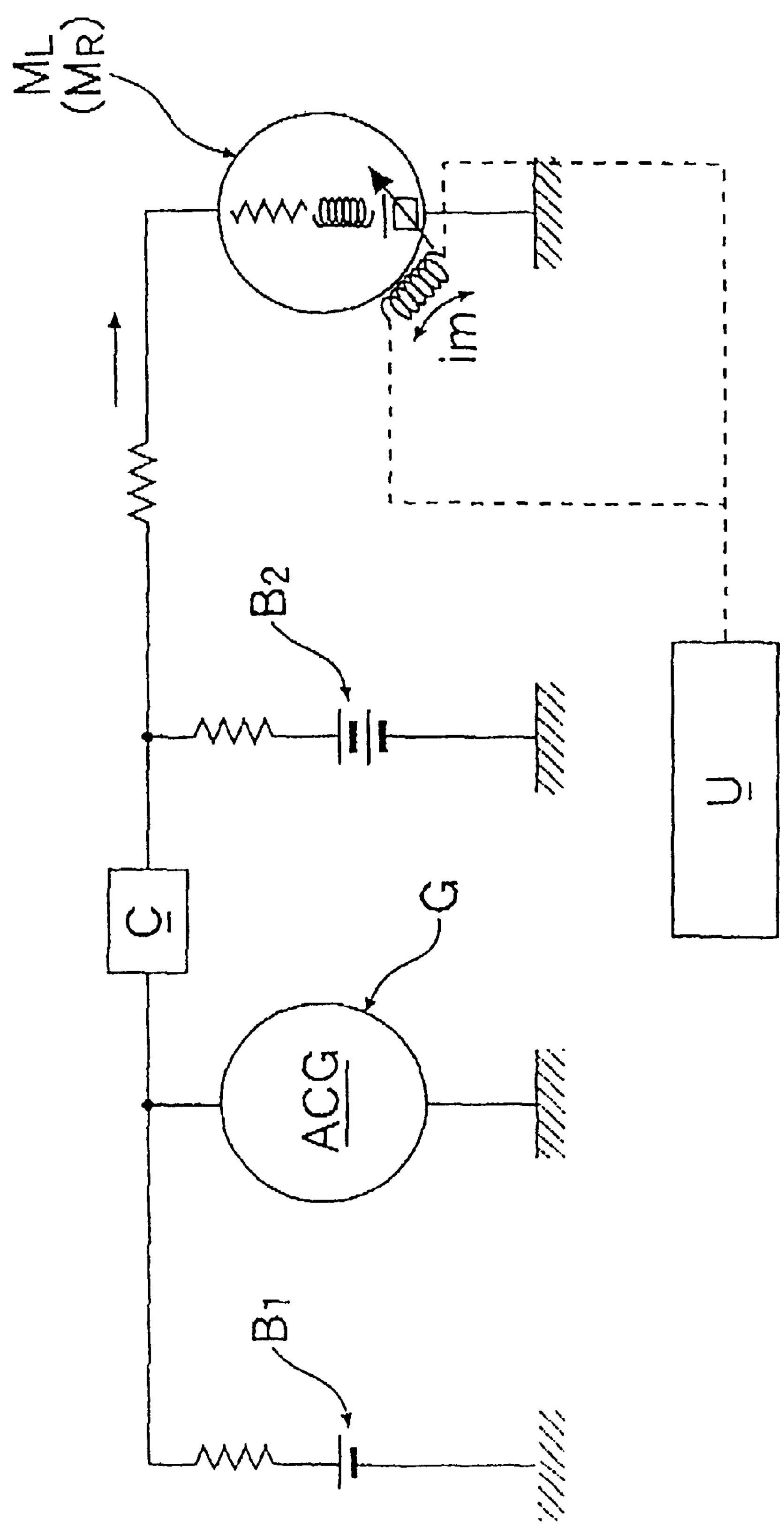
FIG. 7 is an electrical circuit diagram of a driving system of a motor.

As shown in FIG. 7, the described driving of the left and right motors $M_L$, $M_R$ is effected by power stored in the second batteries $B_2$, $B_2$. The generator G is provided with an IC regulator for controlling the generated voltage to 12 volts, and charging the second batteries $B_2$, $B_2$ comprising two 12-volt batteries connected in series is effected by increasing the generated voltage of 12 volts generated from the generator G to 24 volts with the DC-DC converter C.

Figure 8:
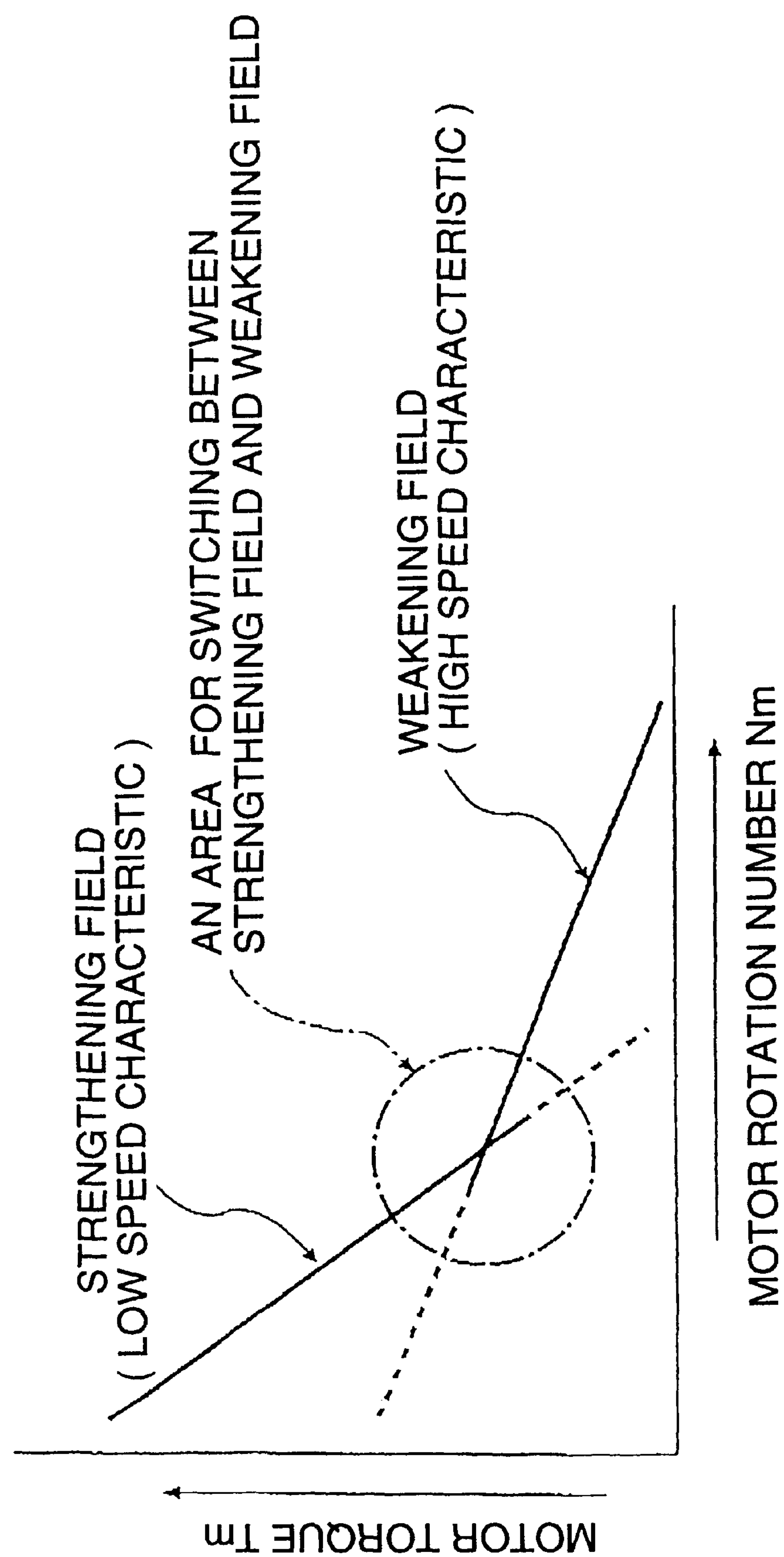
FIG. 8 is a graph showing a relationship between motor rotation number and motor torque.

The above motors $M_L$, $M_R$ are field-switching motors, and with these motors, field current im flowing through the stators 26, 26 constructing fields for the respective motors is increased or decreased through a command from the electronic control unit U such as to strengthen or weaken magnetic fluxes flowing across the rotors 27, 27. Thus, the rotation number-torque characteristics of the motors $M_L$, $M_R$ can be controlled at will. In other words, as shown in FIG. 8, the field current im is strengthened so as to increase the motor torque Tm in an area where the motor rotation number Nm is slow, while in an area where the motor rotation number Nm is fast, the field current im can be weakened so as to increase the motor rotation number Nm. This field switching control of the motors $M_1$, $M_R$ is effected based on the rear wheel rotation number detected by the rear wheel rotation number sensors $S_2$, $S_2$ and the armature voltages of the motors $M_L$, $M_R$ detected by the current sensors $S_6$, $S_6$ when the above-described start assist controls are performed.

The field switching control of the motors $M_L$, $M_R$ is effected in response to the motor rotation numbers, and when the vehicle V is assisted in starting, the left and right rear wheels $W_{RL}$, $W_{RR}$ are driven by the left and right motors $M_L$, $M_R$, and the motor rotation numbers at that time are in relation to the rear wheel speeds detected by the rear wheel rotation number sensors $S_2$, $S_2$ Therefore, in this embodiment, there is provided no motor rotation number sensor, but outputs from the rear wheel rotation number sensors $S_2$, $S_2$ are used as substitutes for signals from the motor rotation number sensors. These rear wheel rotation number sensors $S_2$, $S_2$ are initially mounted on the vehicle V for the anti-lock brake system and the traction control system, and therefore, making use of them helps reduce the production costs.

Figure 9:
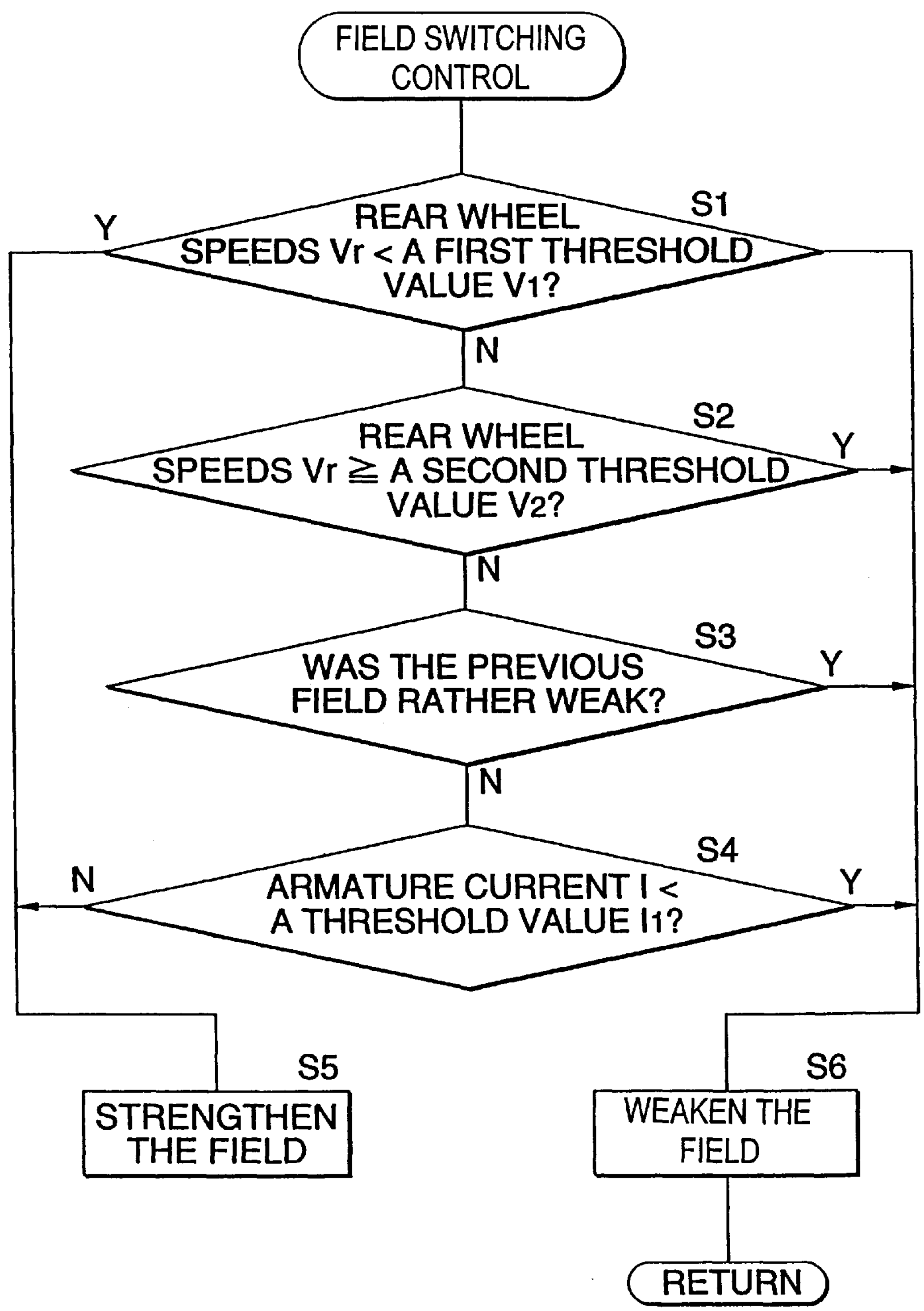
FIG. 9 is a flowchart explaining an operation of the rear wheel driving device.
Figure 10:
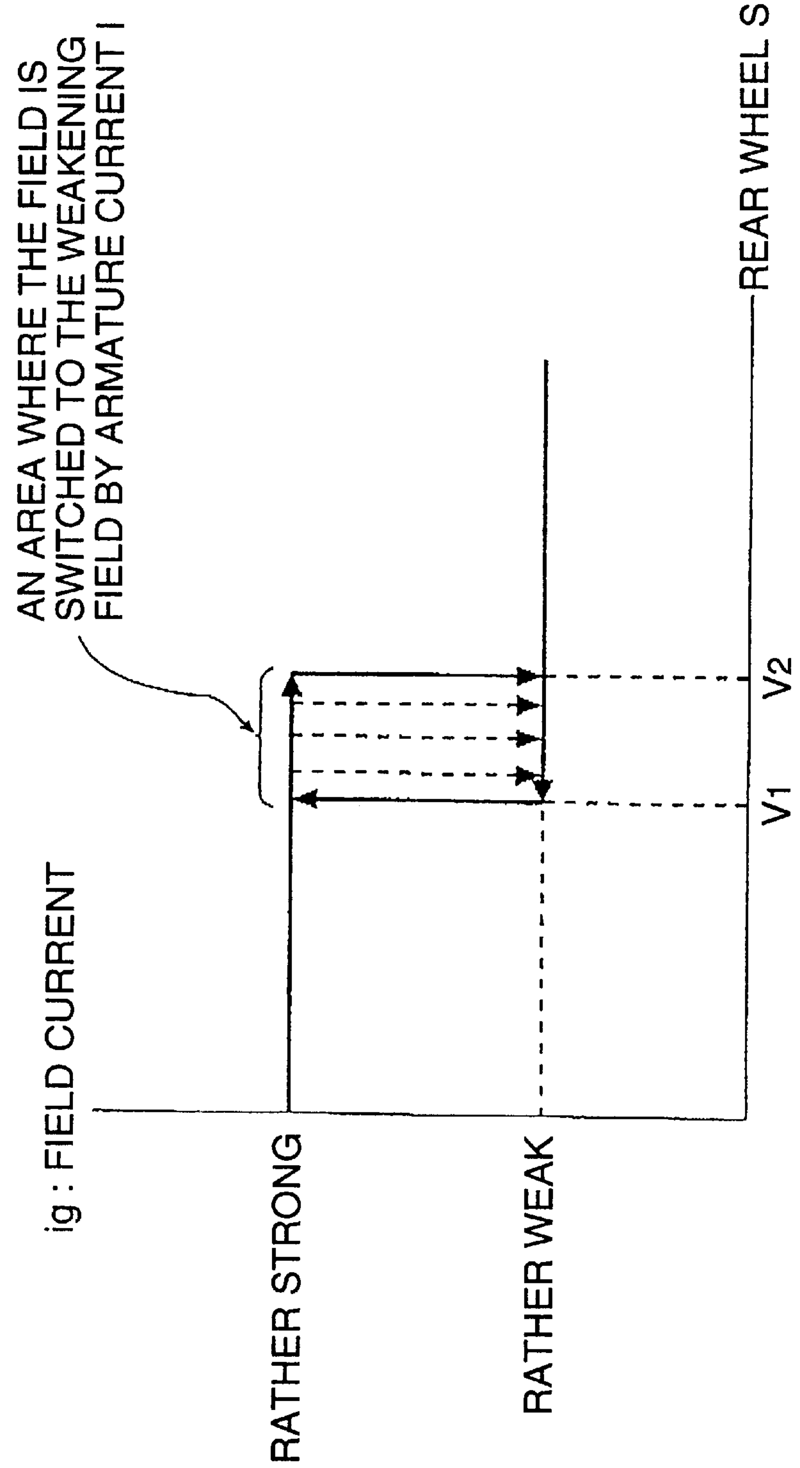
FIG. 10 is a map for retrieving the field current of the motor from the speed of the rear wheels.

Contents of the field switching control will-be described based on the flowchart and the map shown, respectively, in FIGS. 9 and 10.

First, in step S1, rear wheel speeds Vr detected by the rear wheel rotation number sensors $S_2$, $S_2$ are compared with a first threshold value $V_1$. When the rear wheel speeds Vr so detected are determined to be less than the first threshold value $V_1$ with the motors $M_L$, $M_R$ rotating at low speed, in step S5, the field current ig of the motors $M_L$, $M_R$ is strengthened with a view to increasing the motor torque Tg. On the contrary, when the rear wheel speeds Vr are determined to be equal to or larger than the first threshold value $V_1$ in step S1, and when in step S2 the rear wheel speeds Vr are determined to be equal to or larger than a second threshold value $V_2$ which is larger than the first threshold value $V_1$ with the motors $M_L$, $M_R$ rotating at high speed, in step S6, the field current ig is weakened so as to further increase the speeds of the motors $M_L$, $M_R$ to a higher speed side.

If the rear wheel speeds Vr are determined to be equal to or larger than the first threshold value $V_1$ in step S1 and determined to be less than the second threshold value $V_2$ in step S2, and moreover if it is determined in step S3 that the previous field current ig is not weakened, in step S4, armature current I of the motor $M_L$, $M_R$ detected by the current sensors $S_5$, $S_6$ is compared with a threshold value $I_1$. If the armature current I is determined to be equal to or larger than the threshold value $I_1$, in step S5, the field current ig is held as strengthened. On the contrary, if the armature current I is determined to be less than the threshold value I1 in step S4, the field current of the motors $M_L$, $M_R$ is weakened in step S6. Then, if it is determined in step S3 that the previous field current ig of the motors $M_L$, $M_R$ has already been weakened, in step S6, the field current ig of the motors $M_L$, $M_R$ is held as weakened.

That is, when the rear wheel speeds Vr become equal or larger than the first threshold value $V_1$, the filed current of the motors $M_L$, $M_R$ does not have to be weakened instantly but it is weakened, additionally, on condition that the armature current I becomes less than the threshold value $V_1$. When the rear wheel speeds Vr become equal to or larger than the second threshold value $V_2$, the field current ig of the motors $M_L$, $M_R$ is weakened no condition, irrespective of the magnitude of the armature current I.

The reason why the armature current I is to be considered in the field switching control is as below. Since the motor rotation number is not directly detected but is detected indirectly from the rear wheel speeds Vr, it is inevitable that a minor detection error is generated due to looseness and distortion of the power transmission path of the rear wheel driving device D. Then, the above detection error in detecting the motor rotation numbers can be absorbed by switching the field current ig from the rather strong state to the rather weak state not only on condition that the rear wheel speeds Vr become equal to or larger than the first threshold value $V_1$ but also on condition that the armature current I becomes less than the first threshold value $I_1$. Since when the vehicle V starts, the frequency at which the motor rotation numbers are switched from low speed to high speed is overwhelmingly higher than the frequency at which they are switched from high speed to low speed, the aforesaid hysteresis control in which the armature current I is taken into consideration is performed only in a case where the motor rotation numbers are switched from low speed to high speed, and in a case where the rear wheel speeds are switched from high speed to low speed, which happens at a lower frequency than the opposite case, the field current ig is constructed so as to be switched from the rather weak to rather strong state without taking the armature current I into consideration when the rear wheel speeds Vr become less than the first threshold value $V_1$.

In the above first embodiment, the start assist is carried out by driving the motors $M_L$, $M_R$ only when the front wheels $W_{FL}$, $W_{FR}$ slip when the vehicle V starts, but as will be described in a second embodiment below, it is possible to control the driving of the motors $M_L$, $M_R$ in response to the distance the accelerator pedal is depressed, irrespective of the slippage of the front wheels $W_{FL}$, $W_{FR}$.

Specifically speaking, when the vehicle V starts in a state in which the brake operation sensor $S_4$ detects that the brake pedal 7 is not being operated, the shift position sensor $S_5$ detects that the shift position is at the forward running position, and the rear wheel speeds (i.e., the vehicle speed) detected by the rear wheel rotation number sensors $S_2$, $S_2$ are less than 15 km/h, in a case where the accelerator opening detected by an accelerator opening sensor is equal to or larger than a predetermined value and the driver wants acceleration, the motors $M_L$, $M_R$ are driven to rotate forward in response to the accelerator opening to thereby effect desired start assisting, and on the contrary, in a case where the accelerator opening is less than the predetermined value, the motors $M_L$, $M_R$ are not driven. Then, after the vehicle has started and the rear wheel speeds (i.e., the vehicle speed) reach or exceeds 15 km/h, the driving of the motors $M_L$, $M_R$ are stopped and the vehicle start assisting control is completed.

Thus, improvement in fuel economy of the engine E, reduction in exhaust emission from the vehicle V and improvement in acceleration performance of the vehicle V can be attained by carrying out the vehicle start assisting control by driving the motors $M_L$, $M_R$ in starting the vehicle V when a low speed-high output characteristic of the engine E is required. In addition, in a case where the accelerator opening is less than the predetermined value and the driver wants no acceleration, since the motors $M_L$, $M_R$ are not driven, thereby making it possible to control the wasteful power consumption.

Thus, while the embodiments of the present invention have been described in detail heretofore, the present invention may be variously modified without departing from the scope and sprit thereof.

For example, in the embodiments, the front wheels $W_{FL}$, $W_{FR}$ are driven by the engine E and the rear wheels $W_{RL}$, $W_{RR}$ are driven by the motors $M_L$, $M_R$, but on the contrary, the rear wheels $W_{RL}$, $W_{RR}$ may be driven by the engine E and the front wheels $W_{FL}$, $W_{FR}$ may be driven by the motors $M_L$, $M_R$.

Thus, according to the first feature of the invention, since the speed of the motors and the rotating speed of the wheels driven by the motors have the certain relationship, the field current of the motors can be controlled based on outputs from the speed sensors for detecting the rotating speeds of the wheels with provision of no special sensors for detecting the motor rotation numbers so as to switch the low speed-high torque characteristic to the high speed-low torque characteristic of the engine E or vice versa to thereby improve the start assisting performance of the vehicle. In particular, utilizing the speed sensor initially provided on the vehicle for the anti-lock brake system and/or the traction control system contributes to reduction in the number of components involved and production costs.

The present disclosure relates to the subject matter contained in Japanese patent application No. Hei.11-131887 filed on May 12, 1999 which is expressly incorporated herein by reference in its entirety.

What is claimed is:

1. A front-and-rear wheel drive vehicle, comprising:

an engine driving at least one of a pair of front wheels and rear wheels;

a field-control motor driving the other pair of front wheels and rear wheels;

a speed sensor detecting rotating speed of the other pair of wheels; and a control unit controlling field current of said motor based on the detected rotating speed, and wherein the control unit uses the detected rotating speed to indirectly detect a motor rotation number of the field-control motor.

2. The front-and-rear wheel drive vehicle according to claim 1, wherein said motor drives the other pair of wheels such as to render assistance in starting the vehicle, and said assistance terminates when the vehicle speed reaches a predetermined value.

3. The front-and-rear wheel drive vehicle according to claim 1, wherein said speed sensor is a sensor for an anti-lock brake system.

4. The front-and-rear wheel drive vehicle according to claim 1, wherein said speed sensor is a sensor for a traction control system.

5. The front-and-rear wheel drive vehicle according to claim 1, further comprising:

a current sensor detecting armature current of said motor, wherein said control unit further controls said field current of said motor based on the detected armature current.

6. The front-and-rear wheel drive vehicle according to claim 1, further comprising:

a steering angle sensor detecting the steering angle of a steering wheel, wherein said control unit further controls said field current of said motor based on the detected steering angle of said steering wheel.

7. The front-and-rear wheel drive vehicle according to claim 1, further comprising:

a brake operation sensor detecting the operation of a brake pedal, wherein said control unit further controls said field current of said motor based on the detected operation of said brake pedal.

8. The front-and-rear wheel drive vehicle according to claim 1, further comprising:

a shift position sensor detecting a position of a selector lever, wherein said control unit further controls said field current of said motor based on the detected position of said selector lever.

9. The front-and-rear wheel drive vehicle according to claim 1, wherein said control unit strengthens said field current when said detected rotating speed of said other pair of wheels is less than a first threshold value.

10. The front-and-rear wheel drive vehicle according to claim 9, wherein said control unit weakens said field current when said detected rotating speed of said other pair of wheels is greater than or equal to a second threshold value, said second threshold value is greater than said first threshold value.

11. The front-and-rear wheel drive vehicle according to claim 10, wherein said control unit weakens said field current when a previous field current is weak.

12. The front-and-rear wheel drive vehicle according to claim 11, further comprising a current sensor detecting armature current of said motor, wherein said control unit weakens said field current when said armature current is less than an armature threshold value.

13. The front-and-rear wheel drive vehicle according to claim 11, further comprising a current sensor detecting armature current of said motor, wherein said control unit strengthens said field current when said armature current is greater than or equal to a third threshold value.

* * * * *